(12) United States Patent
Harer et al.

(10) Patent No.: US 6,467,566 B1
(45) Date of Patent: Oct. 22, 2002

(54) INTEGRAL BUSHING ASSEMBLY FOR A RACK AND PINION STEERING GEAR

(75) Inventors: Dennis F. Harer, Kingsport; Mark A. Skelton, Mt. Carmel, both of TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/961,838

(22) Filed: Sep. 24, 2001

(51) Int. Cl.$^7$ ................................................. B62D 5/06
(52) U.S. Cl. .................... 180/417; 180/428; 384/16; 277/586; 92/168
(58) Field of Search ................................. 277/549, 572, 277/585, 586; 384/15, 16; 74/422; 180/400, 417, 428, 439; 92/168

(56) References Cited

U.S. PATENT DOCUMENTS

| | | | |
|---|---|---|---|
| 2,862,736 A | * 12/1958 | Russell | |
| 2,915,349 A | * 12/1959 | Gomberg | |
| 3,559,540 A | * 2/1971 | Sheldon | 92/163 |
| 3,806,206 A | * 4/1974 | Tribe et al. | 303/21 F |
| 4,280,741 A | * 7/1981 | Stoll | 308/3.5 |
| 4,301,691 A | * 11/1981 | Walter | 74/422 |
| 4,369,852 A | 1/1983 | Nishikawa et al. | |
| 5,181,581 A | 1/1993 | Engler | |
| 5,285,864 A | 2/1994 | Martin et al. | |
| 5,392,875 A | * 2/1995 | Duffy | 180/132 |
| 5,709,283 A | * 1/1998 | Nief | 180/428 |
| 5,895,051 A | 4/1999 | Bowers | |
| 6,155,375 A | 12/2000 | Gierc et al. | |
| 6,176,147 B1 | 1/2001 | Ozeki | |
| 6,330,929 B1 | * 12/2001 | Gierc et al. | 180/428 |

* cited by examiner

*Primary Examiner*—Avraham Lerner
(74) *Attorney, Agent, or Firm*—Tarolli, Sundheim, Covell, Tummino & Szabo L.L.P.

(57) ABSTRACT

A fluid power assisted rack and pinion steering apparatus (10) for a vehicle includes a rack (40) connectable with steerable wheels of the vehicle, a housing (20) partially enclosing the rack (40) and defining a fluid chamber (39), a bushing (90) encircling the rack (40), a sleeve (110) supporting the rack (40) for sliding movement relative to the bushing (90), and a fluid tight seal member (70) for sealing the fluid chamber (39). The bushing (90) has opposite axial ends and is secured in the housing (20) by an interference fit between an outer surface (94) of the bushing (90) and an inner surface (26) of the housing (20). The sleeve (110) is press fit against a first recessed surface (92) in the bushing (90) of a first diameter. The sleeve (110) thereby extends between the bushing (90) and the rack (40) and engages the rack (40). The seal member (70) is located adjacent a. second recessed surface (103) in one axial end of the bushing (90). The second recessed surface (103) is of a second diameter greater than the first diameter. The seal member (70) sealingly engages both the rack (40) and the housing (20).

14 Claims, 2 Drawing Sheets

INTEGRAL BUSHING ASSEMBLY FOR A RACK AND PINION STEERING GEAR

TECHNICAL FIELD

The present invention relates to a rack and pinion power steering apparatus and, in particular, to an integral bushing assembly for a rack and pinion power steering apparatus.

BACKGROUND OF THE INVENTION

A typical hydraulic rack and pinion power steering apparatus for a vehicle includes a rack that extends axially through a chamber inside a hydraulic cylinder, or housing. The ends of the rack project axially outward from the terminal ends of the housing and are connected with steering linkage that connects to steerable vehicle wheels.

A piston is fixed to the rack within the chamber. Rotation of the vehicle steering wheel actuates a hydraulic valve and causes hydraulic fluid under pressure to act against the piston. The force exerted by the hydraulic fluid moves the piston within the chamber, causing the rack to move axially. The axial movement of the rack moves the steering linkage that, in turn, causes the steerable vehicle wheels to turn.

To prevent hydraulic fluid from flowing out of the chamber, it is necessary to seal the ends of the chamber through which the rack projects. It is also desirable to support the rack for axial movement within the chamber without losing the integrity of the seal. A bushing and seal assembly is typically used for this purpose. It is known to enclose the ends of the chamber with bellows attached to the housing to prevent the ingress of moisture, dirt, or other contaminant into the housing and bearing surfaces.

An apparatus that allows the secure connecting of the bushing to a plain, unmachined end of the housing, and the bellows, with a minimal number of separate pieces would increase service life of the apparatus while decreasing assembly time and production cost.

SUMMARY OF THE INVENTION

One feature of the present invention is a fluid power assisted rack and pinion steering apparatus for a vehicle. The apparatus comprises a rack connectable with steerable wheels of the vehicle, a housing partially enclosing the rack and defining a fluid chamber, a bushing encircling the rack, a sleeve supporting the rack for sliding movement relative to the bushing, and a fluid tight seal member for sealing the fluid chamber. The rack has a longitudinal axis and is movable in opposite axial directions to turn the steerable wheels in opposite directions. The bushing has opposite axial ends and is secured in the housing by an interference fit between an outer surface of the bushing and an inner surface of the housing. The sleeve is press fit against a first recessed surface in the bushing of a first diameter. The sleeve thereby extends between the bushing and the rack and engages the rack. The seal member is located adjacent a second recessed surface in one axial end of the bushing. The second recessed surface is of a second diameter greater than the first diameter. The seal member encircles the rack and extends between the rack and the housing. The seal member further sealingly engages both the rack and the housing.

Another feature of the present invention is a fluid power assisted rack and pinion steering apparatus for a vehicle. The apparatus comprises a rack connectable with steerable wheels of the vehicle, a housing partially enclosing the rack and defining a fluid chamber, a bushing encircling the rack, a sleeve supporting the rack for sliding movement relative to the bushing, and a fluid tight seal member for sealing the fluid chamber. The rack has a longitudinal axis and is movable in opposite axial directions to turn the steerable wheels in opposite directions. The housing has at least one terminal end portion with a cylindrical inner surface having a constant inner diameter. The bushing has an outer surface engaging the inner surface of the housing. The sleeve is press fit into a first recess at an inner diameter of the bushing. The seal member encircles the rack and extends between the rack and the housing. The seal member is located in a second recess at an axial end of the bushing.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 3 is a view taken along line 3—3 in FIG. 2.

DESCRIPTION OF A PREFERRED EMBODIMENT

Figure 1:
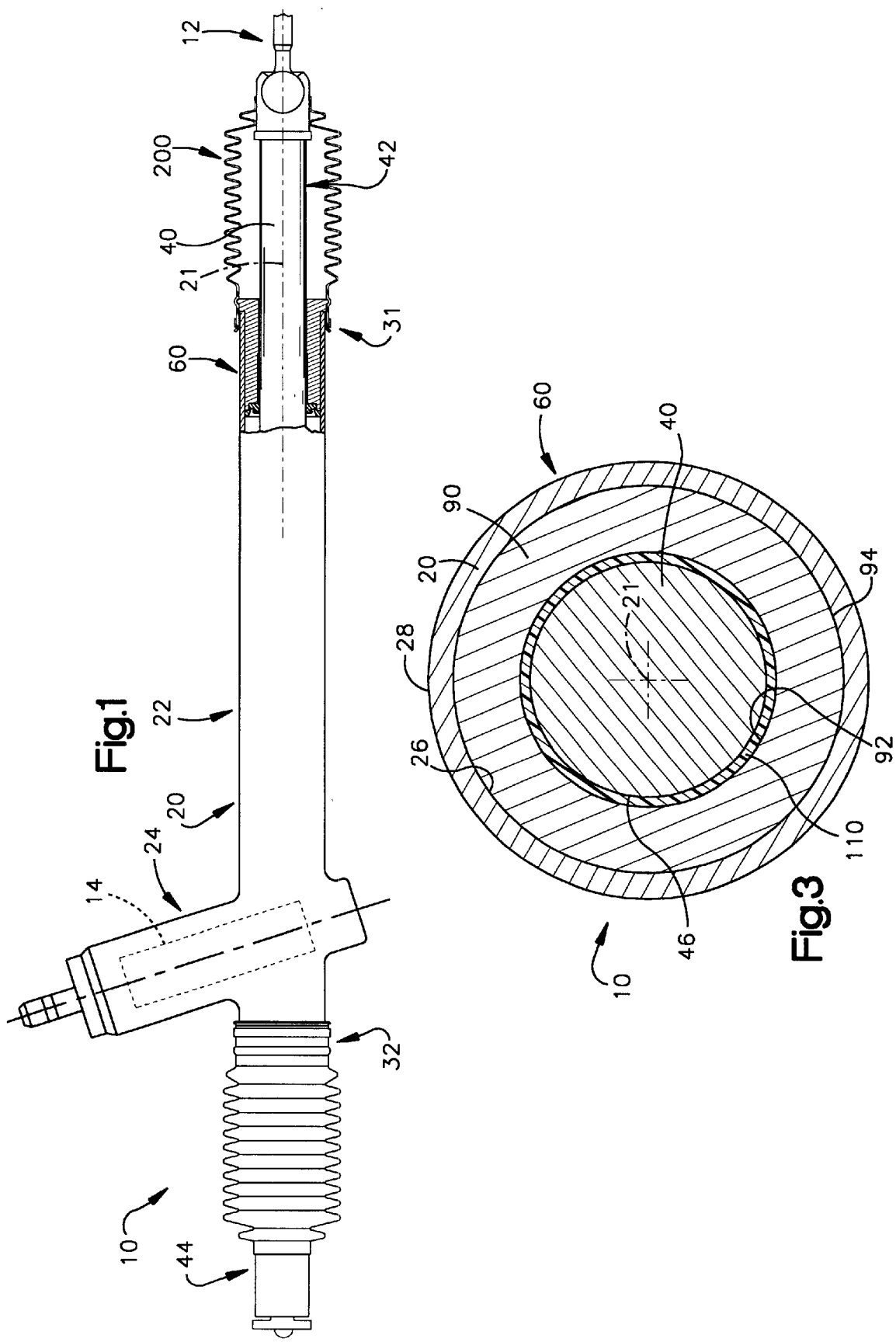
FIG. 1 is a schematic view of a rack and pinion power steering apparatus embodying the present invention.

The present invention relates to a rack and pinion power steering apparatus and, in particular, is directed to an integral bushing assembly for a rack and pinion power steering apparatus. The present invention may be applicable to various steering apparatus constructions. As representative of the present invention, FIG. 1 illustrates a rack and pinion power steering apparatus 10. The steering apparatus 10 is connected with a pair of steerable vehicle wheels (not shown) in a known manner by steering linkage 12 at one end of the steering apparatus and by similar steering linkage (not shown) at the other end of the steering apparatus.

The steering apparatus 10 includes a housing 20 having a longitudinal axis 21, a pinion 14, a rack 40 having the same longitudinal axis as the housing, and a bushing assembly 60. The housing 20 includes a rack portion 22 and a transversely extending pinion portion 24. The pinion 14 is disposed in the pinion portion 24 of the housing 20 and has teeth (not shown) that meshingly engage teeth (not shown) on the rack 40 inside the housing at the intersection of the pinion portion and the rack portion 22.

Figure 2:
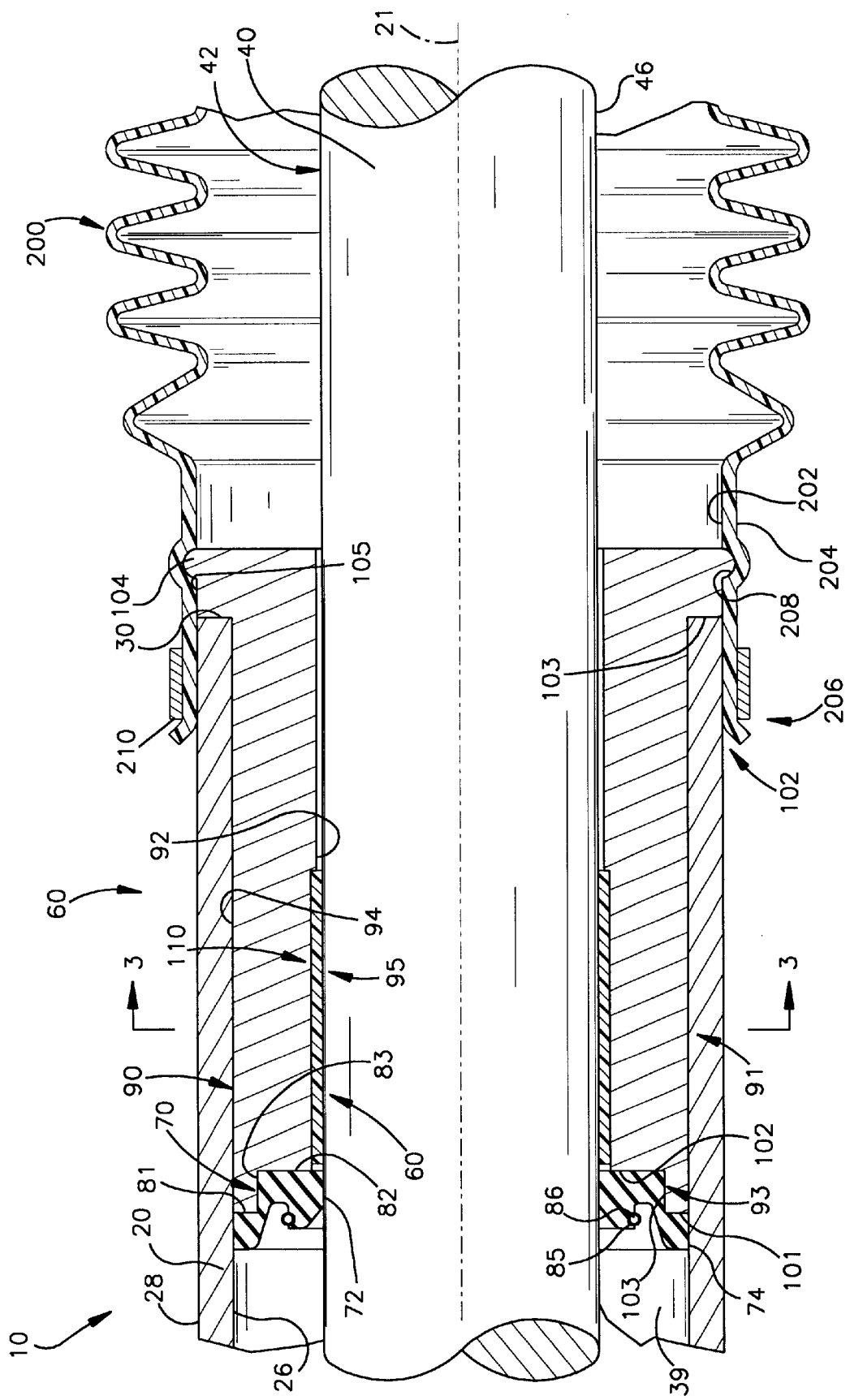
FIG. 2 is an enlarged sectional view of a portion of the power steering apparatus of FIG. 1 illustrating a bushing assembly constructed in accordance with the present invention.

As viewed in FIGS. 2 and 3, the rack portion 22 of the housing 20 has cylindrical inner and outer surfaces 26, 28, both centered about the longitudinal axis 21. The housing 20 further has a first terminal end portion 31 and a second terminal end portion 32 opposite the first terminal end portion (FIG. 1). The inner and outer surfaces 26, 28 both have constant inner diameters such that both surfaces define uniform cylinders at the terminal end portions 31, 32 of the housing 20. An annular end surface 30 of the housing 20 extends between the inner and outer surfaces 26, 28 at the first terminal end 31 of the housing 20. The inner surface 26 in the rack portion 22 further defines a fluid chamber 39 within the housing 20.

The rack 40 is centered on the axis 21 and extends axially through the fluid chamber 39 in the housing 20. Oppositely disposed distal ends 42 and 44 (FIG. 1), respectively, of the rack 40 project axially beyond the terminal end portions 31, 32 of the housing 20 and are connected to the steering linkages 12. The rack 40 has a cylindrical outer surface 46 partially within the fluid chamber 39 and partially enclosed by the housing 20. The distal ends 42, 44 of the rack 40 each extend axially outward from the housing 20.

A piston (not shown) is fixed to the rack 40 inside the fluid chamber 39. Upon rotation of the vehicle steering wheel (not shown), fluid under pressure in the fluid chamber 39 acts against the piston, causing the rack 40 to move axially within the housing 20. Such axial movement of the rack 40 in opposite directions moves the steering linkages 12 in opposite directions, and thus turns the steerable vehicle wheels in opposite directions, as is known.

The bushing assembly 60 is located at the first terminal end portion 31 of the housing 20. A similar bushing assembly (not shown) may be located at the second terminal end portion 32 of the housing 20. The bushing assembly 60 encircles the rack 40 and is centered on the axis 21. The bushing assembly 60 is connected to the housing 20 and supports the rack 40 for axial movement relative to the housing. The bushing assembly 60 further seals the fluid chamber 39 against the fluid leaking out of the housing 20. The bushing assembly 60 comprises an annular seal member 70, an annular bushing 90, and a cylindrical liner, or sleeve 110.

The bushing 90 is located in the fluid chamber 39 and extends radially between the housing 20 and the sleeve 110. The bushing 90 also extends axially from the end surface 30 of the housing 20 into the fluid chamber 39 in one axial direction and outward along the distal end 42 of the rack 40. In another opposite axial direction. The bushing 90 encircles the outer surface 46 of the rack 40, but does not engage the outer surface 46. The bushing 90 includes cylindrical inner and outer surfaces 92, 94, respectively. Thus, the inner surface 92 of the bushing 90 does not engage, and is spaced radially from, the outer surface 46 of the rack 40.

The bushing 90 further has a first section 91 and an axially opposite second section 102. The first section 91 extends axially along the inner surface 26 of the housing 20 from the end surface 30 of the housing. The first section 91 of the bushing 90 is secured in the housing 20 solely by an interference fit between the outer surface 94 of the bushing 90 and the inner surface 26 of the housing. The first section 91 of the bushing 90 thereby defines an axial end of the fluid chamber.

The interference fit allows the bushing assembly 60 to be secured to the housing 20 without the necessity of other locking features (i.e., lock wire, locking ring, crimp of the housing, etc.). Further, the terminal end portions 31, 32 of the housing 20 may be formed as plain cylindrical tube ends without the need for any further modification (i.e., machining, tapering, forming, crimping, etc.). However, the terminal end portions 31, 32 may optionally be modified to include crimping, crush pads, etc. in order to augment the connection provided by the interference fit. The interference fit is typically provided by the outside diameter of the bushing 90 being nominally about 0.2 mm larger than the inside diameter of the housing 20.

The first section 91 of the bushing 90 further defines a first recess 93 for receiving the seal member 70. The bushing 90 may be made of a metallic material, such as zinc, a powdered metal, or cast aluminum.

The sleeve 110 is preferably press fit into a second recess 95 on the inner surface 92 of the bushing 90 to form a single unitary part with the bushing. The sleeve 110 supports the rack 40 for sliding movement relative to the housing 20 and the bushing 90. The sleeve 110 further provides a bearing surface between the axially moving rack 40 and the stationary bushing 90 thereby reducing wear between moving parts. The sleeve 110 may be made of a polymer composite material such as 35% glass-filled polyester (RYNITE brand polyester) or KEVLAR/TEFLON (both available from E.I. DuPont de Nemours & Co.)

The fluid tight annular seal member 70 is attached to the first section 91 of the bushing 90 and provides a fluid tight seal for the fluid chamber 39 of the housing 20. The seal member 70 is typically made of an elastomeric material, such as Viton® or hydrogenated Nitrile®. The seal member 70 includes cylindrical inner and outer sealing surfaces 72, 74, respectively. The outer surface 74 of the seal member 70 sealingly engages the inner surface 26 of the housing 20. The inner surface 72 of the seal member 70 sealingly engages the outer surface 46 of the rack 40, which is axially movable relative to the seal member.

The seal member 70 has first, second, and third surfaces 81, 82, and 83, respectively, which abut a first annular surface 101, a second recessed annular surface 102, and a third recessed cylindrical surface 103, respectively, in the axial end of the first section 91 of the bushing 90. The seal member 70 is preferably secured to the bushing 90 by pressing the seal member into the recess 93 defined by the surfaces 101, 102, 103 in the first section 91 of the bushing.

The first surface 81 of the seal member 70 engages the first surface 101 of the bushing 90. The second surface 82 of the seal member 70 engages the second surface 102 of the bushing 90. The third surface 83 of the seal member 70 engages the third surface 103 of the bushing 90. Preferably, a small gap remains between the second surface 82 of the seal member 70 and the sleeve 110 so that the sleeve in no way imparts axial force to the seal member and does not thereby dislodge the seal member from its position on the bushing 90.

The seal member 70 further includes an annular groove 85 in which a metallic garter spring 86 is located. The garter spring 86 exerts a radially inward force on a portion of the seal member 70 to force the inner surface 72 of the seal member against the outer surface 46 of the rack 40 and maintain a fluid tight seal between the seal member and the intermittently moving rack.

The first and second sections 91, 102 of the bushing 90 are formed together as one piece, meaning that the first and second sections are made of a single homogeneous material as a single unit, rather than as separate parts that are joined together.

The second section 102 of the bushing 90 projects axially beyond the end surface 30 of the housing 20. The second section 102 includes an annular surface 103 that acts as a bushing-positioning surface. The surface 103 abuts the end surface 30 of the housing 20 and thereby determines the position of the bushing 90 relative to the housing 20. The second section 102 further has a cylindrical outer surface 105 having a diameter substantially equal to the diameter of the outer surface 28 of the terminal end 31 of the housing 20. The second section 102 of the bushing 90 includes a circumferentially extending, annular retaining ridge 104 (FIG. 2). The retaining ridge 104 extends radially from the outer surface 105 and has a semi-cylindrical shape in cross-section. The retaining ridge 104 is typically formed as a single-piece with the bushing 90.

The steering apparatus 10 further includes a bellows member 200 encircling the rack 40 and enclosing the second section 102 of the bushing 90 and the distal end 42 of the rack 40. The bellows member 200 is made of a suitable flexible material such as rubber. The bellows member 200 is attached to the second section 102 of the bushing 90. The bellows member 200 has inner and outer surfaces 202, 204, respectively, and an end portion 206. Typically, a circumferentially extending groove 208 is formed in the inner surface 202 of the bellows member 200 and receives the retaining ridge 104 on the bushing 90 to assist in securing the bellows member to the bushing and the housing 20.

A ring-shaped band clamp 210 may encircle the outer surface 28 of the terminal end 31 of the housing 20. The band clamp 210 compresses the end portion 206 of the bellows member 200 against the housing 20 to assist in securing the bellows member to the bushing 90 and the housing. By attaching the bellows member 200 to the plain outer surface 28 of the housing 20 and the bushing 90 itself, the manufacture of the housing is simplified because a bellows retention feature does not have to be incorporated at the terminal end 31 of the housing. Thus, the present invention provides an integral bushing assembly 60 that seals the fluid chamber 39, supports the rack 40 for sliding movement, and securely retains the bellows member 200.

From the above description of the invention, those skilled in the art will perceive improvements, changes and modifications. Such improvements, changes and modifications within the skill of the art are intended to be covered by the appended claims.

Having described the invention, we claim:

1. A fluid power assisted rack and pinion steering apparatus for a vehicle, said apparatus comprising:

a rack connectable with steerable wheels of the vehicle, said rack having a longitudinal axis and being movable in opposite axial directions to turn the steerable wheels in opposite directions;

a housing partially enclosing said rack and defining a fluid chamber;

a bushing encircling said rack and having opposite axial ends, said bushing being secured in said housing by an interference fit between an outer surface of said bushing and an inner surface of said housing;

a sleeve supporting said rack for sliding movement relative to said bushing, said sleeve being press fit against a first recessed surface in said bushing of a first diameter, said sleeve thereby extending between said bushing and said rack and engaging said rack; and a fluid tight seal member for sealing said fluid chamber, said seal member being located adjacent a second recessed surface in one axial end of said bushing, said second recessed surface being of a second diameter greater than said first diameter, said seal member encircling said rack and extending between said rack and said housing, said seal member sealingly engaging both said rack and said housing.

2. The apparatus as set forth in claim 1 wherein said housing has at least one terminal end portion with a cylindrical inner surface having a constant inner diameter.

3. The apparatus as set forth in claim 1 wherein said sleeve comprises a cylindrical member secured to said first recessed surface, said first recessed surface defining a cylinder.

4. The apparatus as set forth in claim 1 wherein said second recessed surface of said bushing partially defines a recess into which said seal member is pressed.

5. The apparatus as set forth in claim 1 wherein said first recessed surface of said bushing partially defines a recess into which said sleeve is pressed.

6. The apparatus as set forth in claim 1 wherein said bushing is spaced radially from said rack.

7. The apparatus as set forth in claim 1 wherein said housing includes at least one terminal end portion, said terminal end portion having an annular surface for abutting a surface of said bushing and for positioning said bushing relative to said housing.

8. A fluid power assisted rack and pinion steering apparatus for a vehicle, said apparatus comprising:

a rack connectable with steerable wheels of the vehicle, said rack having a longitudinal axis and being movable in opposite axial directions to turn the steerable wheels in opposite directions;

a housing partially enclosing said rack and defining a fluid chamber, said housing having at least one terminal end portion with a cylindrical inner surface having a constant inner diameter;

a bushing encircling said rack, said bushing having an outer surface engaging said inner surface of said housing;

a sleeve supporting said rack for sliding movement relative to said bushing, said sleeve being press fit into a first recess at an inner diameter of said bushing; and a fluid tight seal member for sealing said fluid chamber, said seal member encircling said rack and extending between said rack and said housing, said seal member being located in a second recess at an axial end of said bushing.

9. The apparatus as set forth in claim 8 wherein said bushing includes a retaining ridge for securing a bellows member to said bushing, said retaining ridge being formed as one-piece with said bushing.

10. The apparatus as set forth in claim 8 wherein said sleeve is made from a polymer material.

11. The apparatus as set forth in claim 10 wherein said bushing is made from a metallic material.

12. The apparatus as set forth in claim 8 wherein said first recess is partially defined by a first recessed surface on said bushing.

13. The apparatus as set forth in claim 12 wherein said second recess is partially defined by a second recessed surface on said bushing, said second recessed surface being of a diameter greater than a diameter of said first recessed surface.

14. The apparatus as set forth in claim 8 wherein said bushing is secured to said housing solely by an interference fit between an outer surface of said bushing and an inner surface of said housing.

* * * * *